United States Patent
Kawada et al.

(10) Patent No.: US 8,045,132 B2
(45) Date of Patent: Oct. 25, 2011

(54) METHOD AND APPARATUS FOR REPAIRING A LIQUID CRYSTAL PANEL

(75) Inventors: Yoshitaka Kawada, Tokyo (JP); Hiroshi Ito, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1502 days.

(21) Appl. No.: 11/445,298

(22) Filed: Jun. 2, 2006

(65) Prior Publication Data

US 2006/0285068 A1    Dec. 21, 2006

(30) Foreign Application Priority Data

Jun. 3, 2005    (JP) .................................. 2005-164379

(51) Int. Cl.
  *G02F 1/13*    (2006.01)
(52) U.S. Cl. ...................................................... 349/192
(58) Field of Classification Search .................... 349/192
  See application file for complete search history.

(56) References Cited

U.S. PATENT DOCUMENTS

| | | | |
|---|---|---|---|
| 6,340,999 B1 * | 1/2002 | Masuda et al. ................. | 349/63 |
| 6,781,659 B2 | 8/2004 | Shiota et al. | |
| 7,515,243 B2 * | 4/2009 | Watamura ..................... | 349/192 |
| 2004/0041977 A1 | 3/2004 | Shen | |
| 2005/0213022 A1 | 9/2005 | Kawada | |
| 2008/0304003 A1 * | 12/2008 | Lai ................................ | 349/192 |

FOREIGN PATENT DOCUMENTS

| | | |
|---|---|---|
| JP | 60-243635 | 12/1985 |
| JP | 03-069914 | 3/1991 |
| JP | 5-313167 | 11/1993 |
| JP | 05-313167 H * | 11/1993 |

(Continued)

OTHER PUBLICATIONS

Japanese Office Action issued in Japanese Patent Application No. 2005-164379 on Aug. 2, 2010 (with English Translation) with Search Report.

(Continued)

*Primary Examiner* — Nathanael R Briggs
(74) *Attorney, Agent, or Firm* — Oblon, Spivak, McClelland, Maier & Neustadt, L.L.P.

(57) ABSTRACT

A method of repairing a liquid crystal panel by irradiating a defective pixel of the liquid crystal panel with laser light, comprises: in a defective pixel including a dust, irradiating at least part of the defective pixel outside the dust with laser light while the dust is not substantially irradiated with the laser light. Alternatively, a method of repairing a liquid crystal panel by irradiating a defective pixel of the liquid crystal panel with laser light, comprises: in a defective pixel including a dust, determining a non-irradiation area including the dust and an irradiation area not including the dust, and irradiating at least part of the irradiation area with laser light while the non-irradiation area is not irradiated with the laser light. An apparatus for repairing a liquid crystal panel, comprises: a laser oscillator which emits laser light; a stage on which the liquid crystal panel is mounted; an optical section which guides the laser light emitted from the laser oscillator to the liquid crystal panel mounted on the stage; and a controller which controls at least one of the stage and the optical section so that, when a dust is included in a defective pixel of the liquid crystal panel, at least part of the defective pixel outside the dust is irradiated with the laser light while the dust is not substantially irradiated with the laser light.

12 Claims, 21 Drawing Sheets

FOREIGN PATENT DOCUMENTS

| | | |
|---|---|---|
| JP | 6-51314 | 2/1994 |
| JP | 8-15660 | 1/1996 |
| JP | 8-201813 | 8/1996 |
| JP | 10-260419 | 9/1998 |
| JP | 2001-133803 | 5/2001 |
| JP | 2002-341304 | 11/2002 |
| JP | 2003-262842 | 9/2003 |
| JP | 2004-160520 | 6/2004 |
| TW | 200403508 | 3/2004 |
| TW | I225172 | 12/2004 |
| TW | 200535760 | 11/2005 |

OTHER PUBLICATIONS

Taiwanese Office Action issued in Taiwanese Patent Application No. 095119432 on Aug. 17, 2010 (with English Translation).

Office Action issued Feb. 15, 2011 in Taiwan Application No. 095119432 (With English Translation).

Office Action issued Nov. 5, 2010, in Japanese Patent Application 2005-164379 (with English translation).

* cited by examiner

METHOD AND APPARATUS FOR REPAIRING A LIQUID CRYSTAL PANEL

CROSS-REFERENCE TO RELATED APPLICATIONS

This application is based upon and claims the benefits of priority from the prior Japanese Patent Application No. 2005-164379, filed on Jun. 3, 2005; the entire contents of which are incorporated herein by reference.

BACKGROUND OF THE INVENTION

1. Field of the Invention

This invention relates to a method and apparatus for repairing a liquid crystal panel, and more particularly to a method and apparatus for repairing a liquid crystal panel by irradiating pixels having display defects due to dust with laser light.

2. Background Art

Liquid crystal panels are prevailing as screen devices for various home appliances and information terminals including televisions, personal computers, and mobile phones. For further dissemination, it is important to increase the screen size and resolution and to reduce the manufacturing cost.

For repairing defective pixels in an active matrix liquid crystal panel, there is a method of repairing by laser light irradiation. For example, a "bright spot defect" occurs due to failure to block transmitted light caused by a TFT (Thin Film Transistor) malfunction and a defect in the pixel electrode or alignment film. For repairing pixels with bright spot defects, there is a method of repairing by irradiating the alignment film of the defective pixel with laser light to disturb the orientation, thereby decreasing the transmittance to reduce the bright spot defect contrast (e.g., JP 5-313167A (1993) and JP 8-015660A (1996)).

SUMMARY OF THE INVENTION

According to an aspect of the invention, there is provided a method of repairing a liquid crystal panel by irradiating a defective pixel of the liquid crystal panel with laser light, comprising: in a defective pixel including a dust, irradiating at least part of the defective pixel outside the dust with laser light while the dust is not substantially irradiated with the laser light.

According to other aspect of the invention, there is provided a method of repairing a liquid crystal panel by irradiating a defective pixel of the liquid crystal panel with laser light, comprising: in a defective pixel including a dust, determining a non-irradiation area including the dust and an irradiation area not including the dust, and irradiating at least part of the irradiation area with laser light while the non-irradiation area is not irradiated with the laser light.

According to other aspect of the invention, there is provided an apparatus for repairing a liquid crystal panel, comprising: a laser oscillator which emits laser light; a stage on which the liquid crystal panel is mounted; an optical section which guides the laser light emitted from the laser oscillator to the liquid crystal panel mounted on the stage; and a controller which controls at least one of the stage and the optical section so that, when a dust is included in a defective pixel of the liquid crystal panel, at least part of the defective pixel outside the dust is irradiated with the laser light while the dust is not substantially irradiated with the laser light.

DETAILED DESCRIPTION OF THE INVENTION

Embodiments of the invention will now be described with reference to the drawings.

Figure 1:
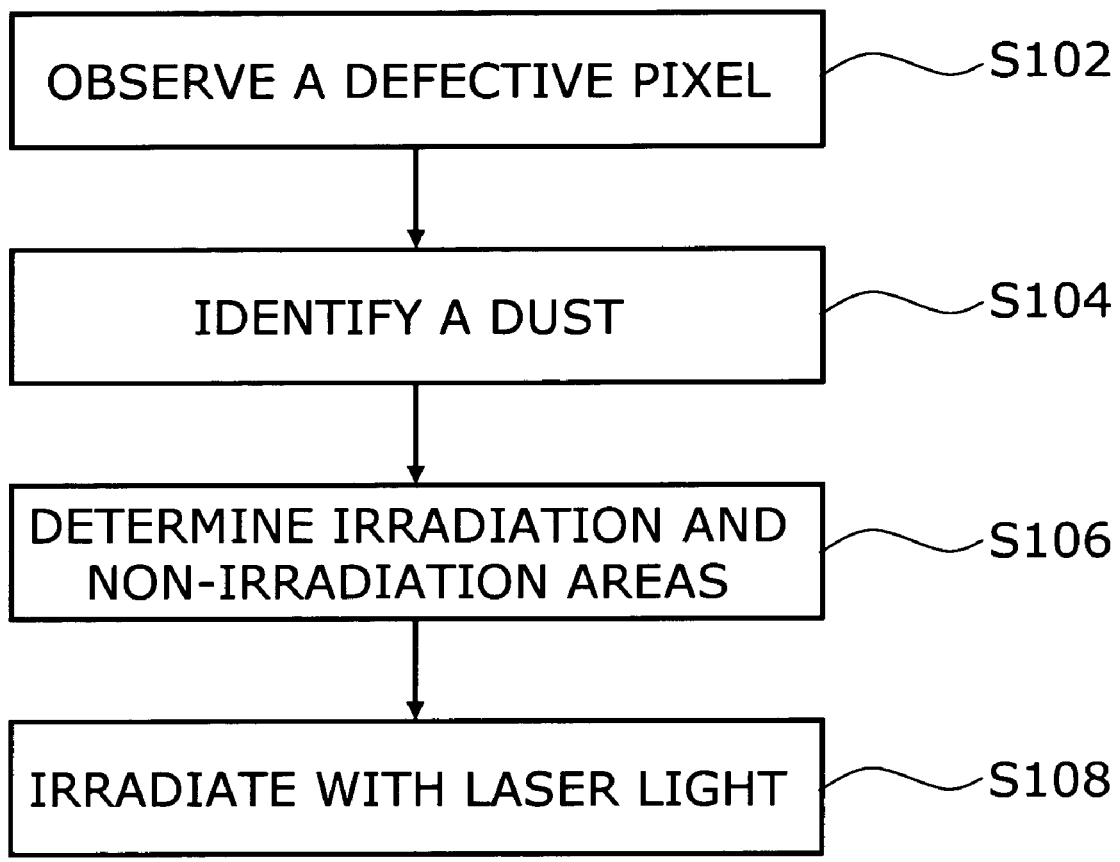
FIG. 1 is a flow chart illustrating a procedure of a method of repairing a liquid crystal panel according to an embodiment of the invention.

FIG. 1 is a flow chart illustrating a procedure of a method of repairing a liquid crystal panel according to an embodiment of the invention.

Figure 2:
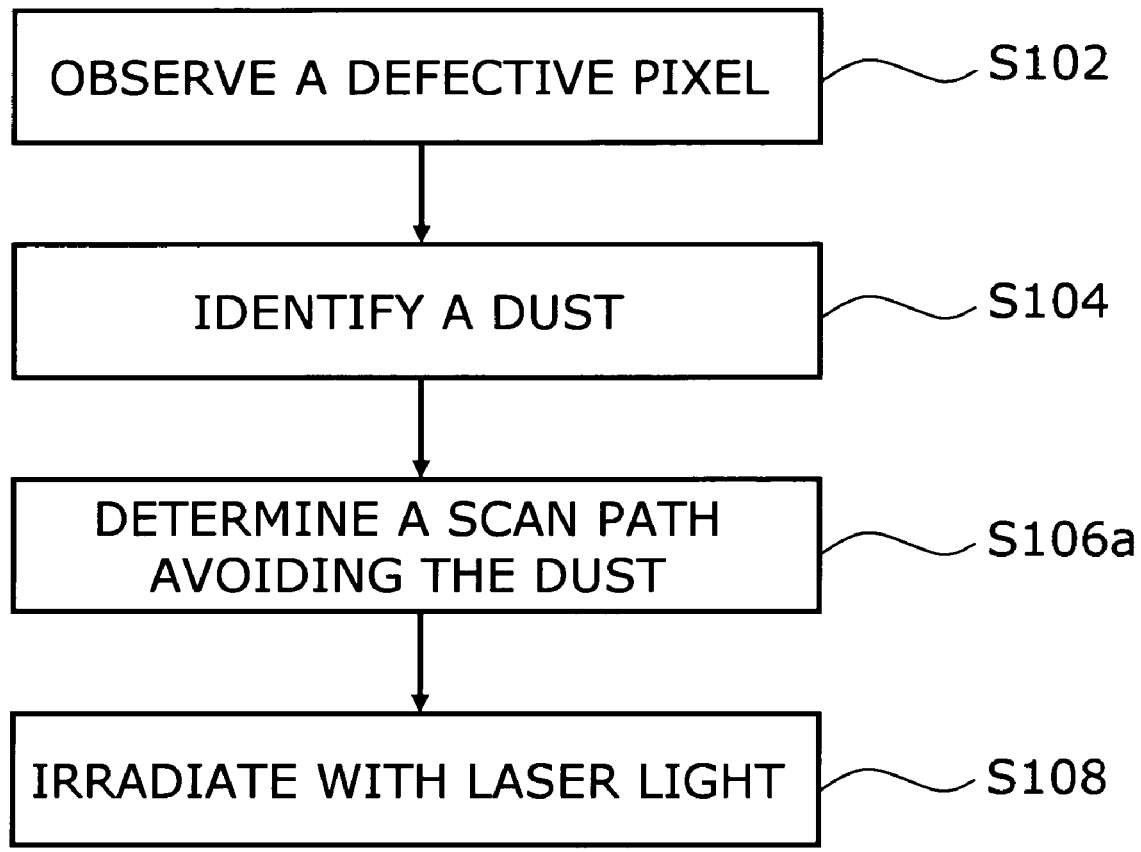
FIG. 2 is a flow chart of an example of the repairing method in FIG. 1.

FIG. 2 is a flow chart showing the repairing method in FIG. 1 in more detail.

More specifically, as shown in FIG. 1, this embodiment begins by observing a defective pixel (step S102) and identifying the shape, size, and position of the dust (step S104). Next, on the basis of this result, the irradiation area and non-irradiation area are determined so that the dust is not irradiated with laser light (step S106). The determined irradiation area is then irradiated with laser light (step S108). In this way, when the dust is not irradiated with laser light, the defective pixel can be reliably repaired without causing damage around the defective pixel.

Figure 3:
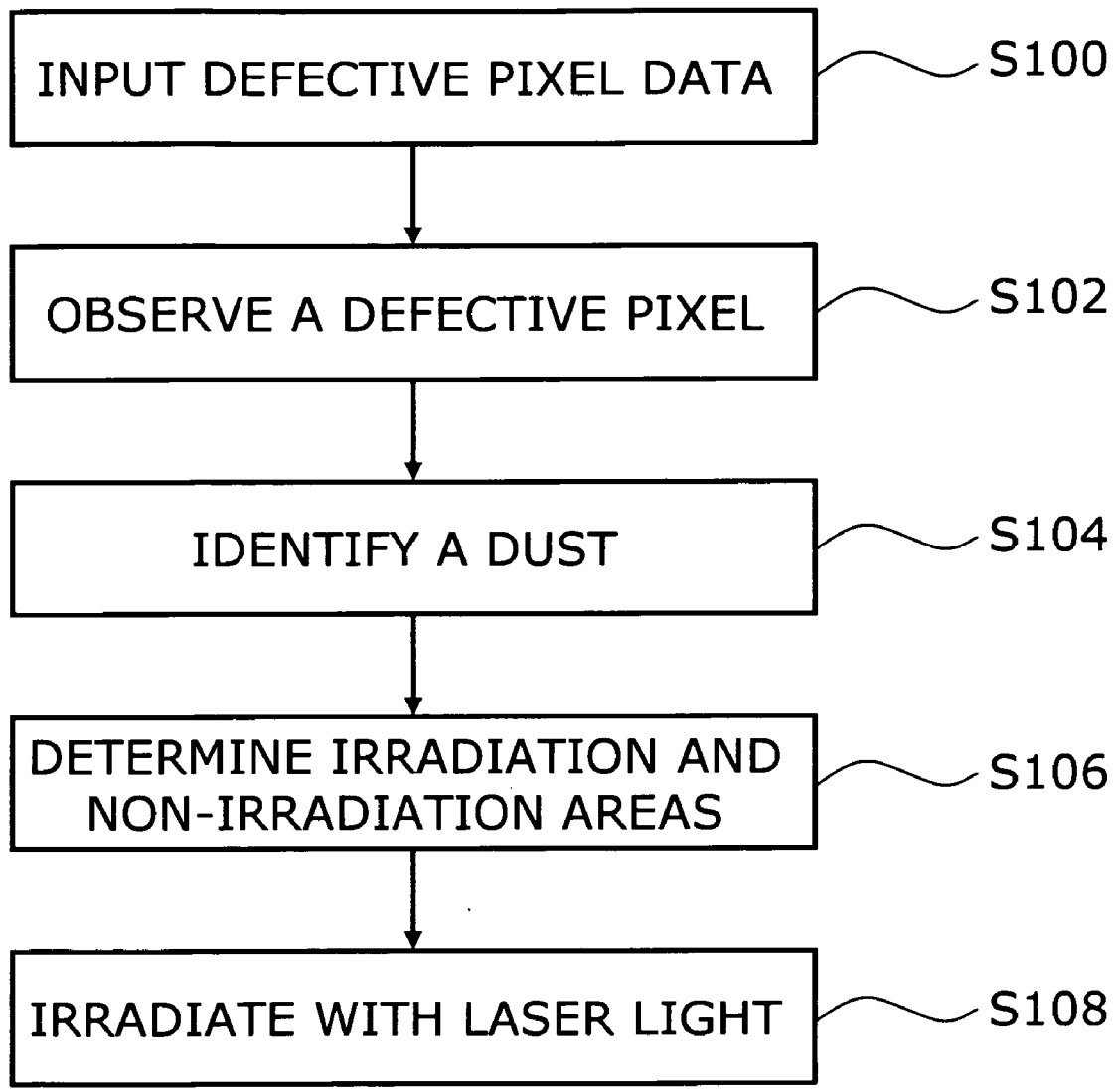
FIG. 3 is a flow chart illustrating another procedure of the method of repairing a liquid crystal panel according to the embodiment of the invention.

FIG. 3 is a flow chart illustrating another procedure of the method of repairing a liquid crystal panel according to the embodiment of the invention.

Figure 4:
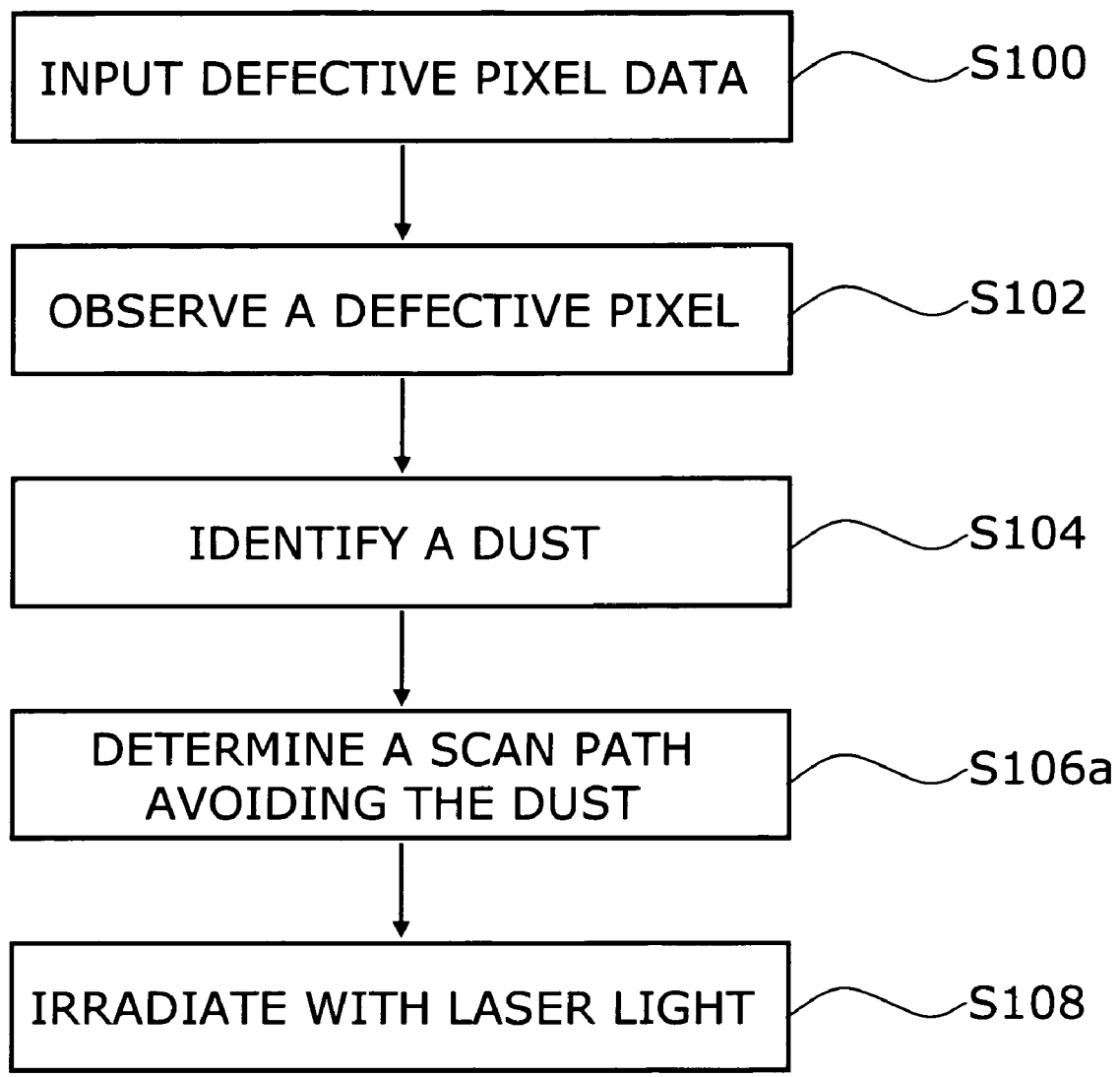
FIG. 4 is a flow chart of an example of the repairing method in FIG. 3.

FIG. 4 is a flow chart showing the method of repairing a liquid crystal panel in FIG. 3 in more detail.

More specifically, the basic procedure of this example shown in FIGS. 3 and 4 is similar to the example shown in FIGS. 1 and 2, except that the former has a step of inputting defective pixel data (step S100) before observing a defective pixel (step S102). The defective pixel data represents, for example, the position of defective pixels such as bright spot defects observed by a LCD inspector.

Figure 5:
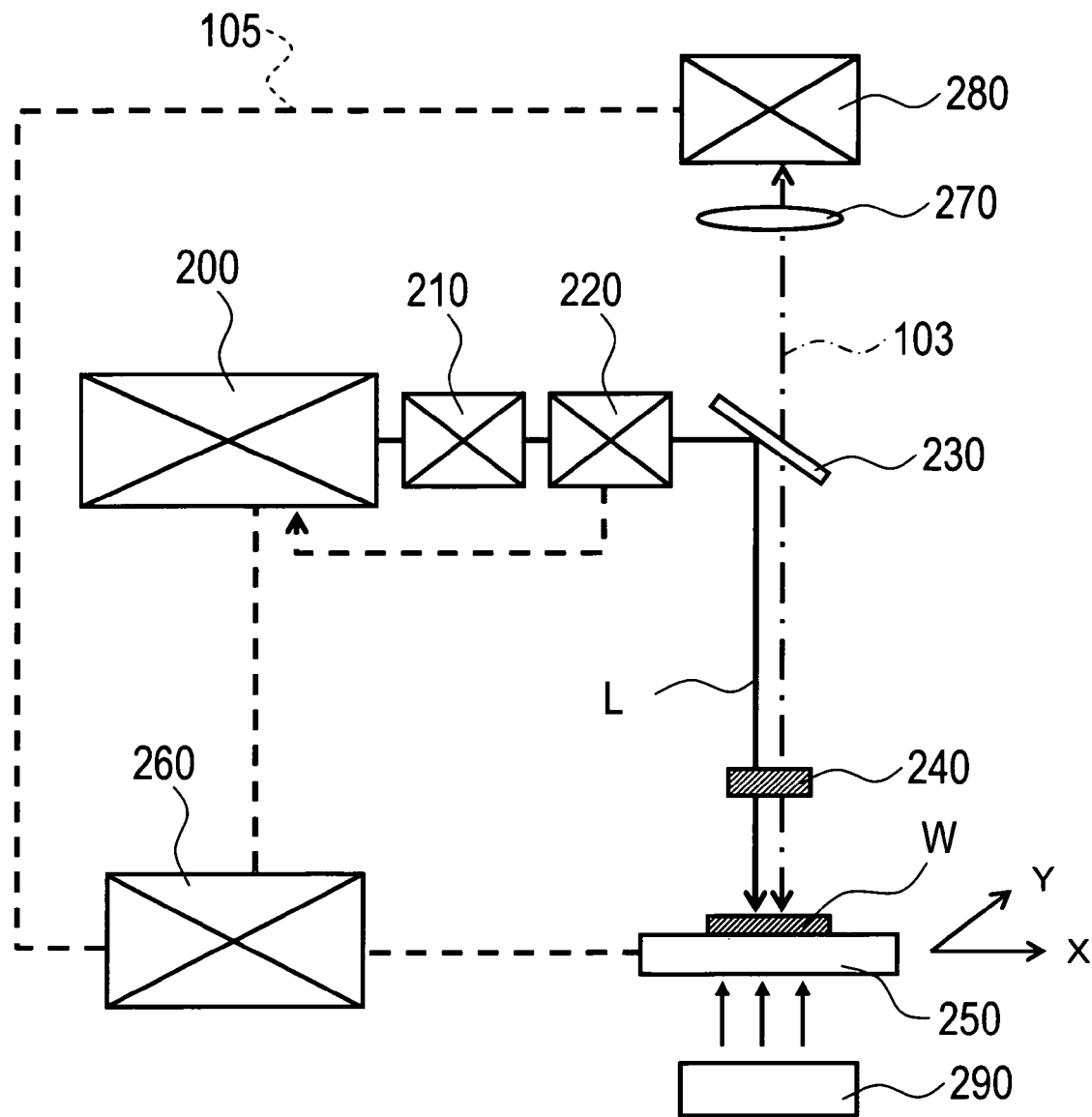
FIG. 5 is a schematic diagram illustrating a basic configuration of a repairing apparatus useful for carrying out the repairing method of this embodiment.

FIG. 5 is a schematic diagram illustrating a basic configuration of a repairing apparatus useful for carrying out this repairing method.

Figure 6:
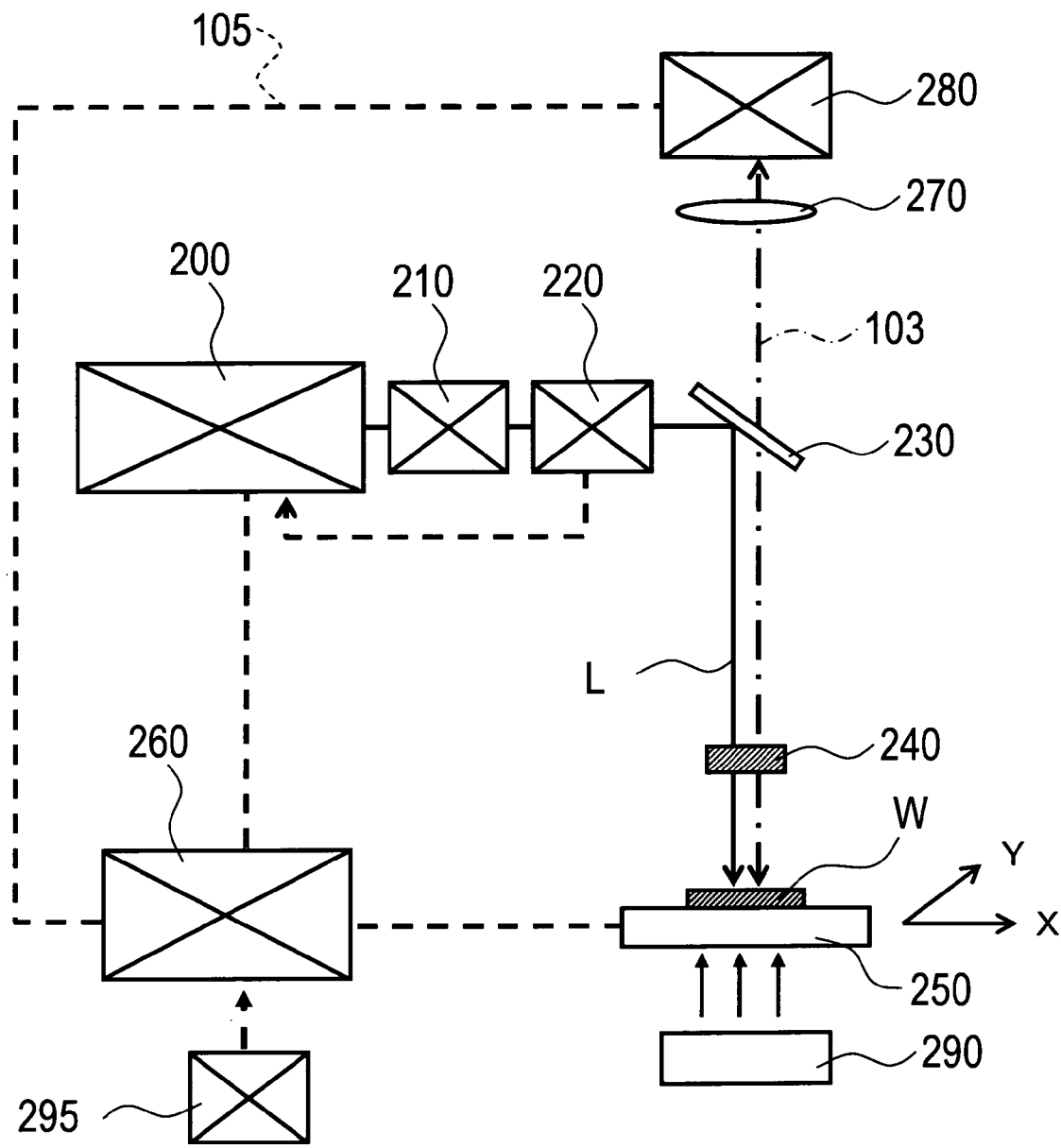
FIG. 6 is a schematic diagram showing another basic example of the repairing apparatus useful in the invention.

FIG. 6 is a schematic diagram illustrating a basic configuration of another repairing apparatus useful in this embodiment.

First, the repairing apparatus shown in FIG. 5 is described.

The repairing apparatus of this example comprises a laser oscillator 200, an XY stage 250, a controller 260, and a CCD camera 280. The laser oscillator 200 outputs laser light, which is adjusted by an attenuator 210, monitored by a power monitor 220, modified with respect to its light path by a half mirror 230, converged by a condensing lens 240, and then incident on a liquid crystal panel mounted on the XY stage 250. Here, the laser light can be scanned on the liquid crystal panel by moving the XY stage 250. Alternatively, as described later in detail, the laser light can be scanned using a movable mirror or movable lens instead of moving the XY stage 250. Irradiation with laser light may not be continuous, but may be intermittent with the irradiation spot being successively displaced.

A transmitting illumination 290 is provided below the XY stage 250. The transmitted optical image of the liquid crystal panel can be observed by the CCD (Charge Coupled Device) camera 280 through the condensing lens 240, the half mirror 230, and a relay lens 270. The operation of these elements is controlled by the controller 260.

The repairing method of this embodiment can be carried out using this repairing apparatus.

In the following, the repairing method of this embodiment is described with reference to FIGS. 1 to 6.

In this embodiment, the method begins by observing a defective pixel in the liquid crystal panel (step S102). For example, the liquid crystal panel W is mounted on the XY stage 250 and illuminated with the transmitting illumination 290 from under the XY stage 250. Thus the image information 103 of the liquid crystal panel W is captured by the CCD camera 280.

Figure 7:
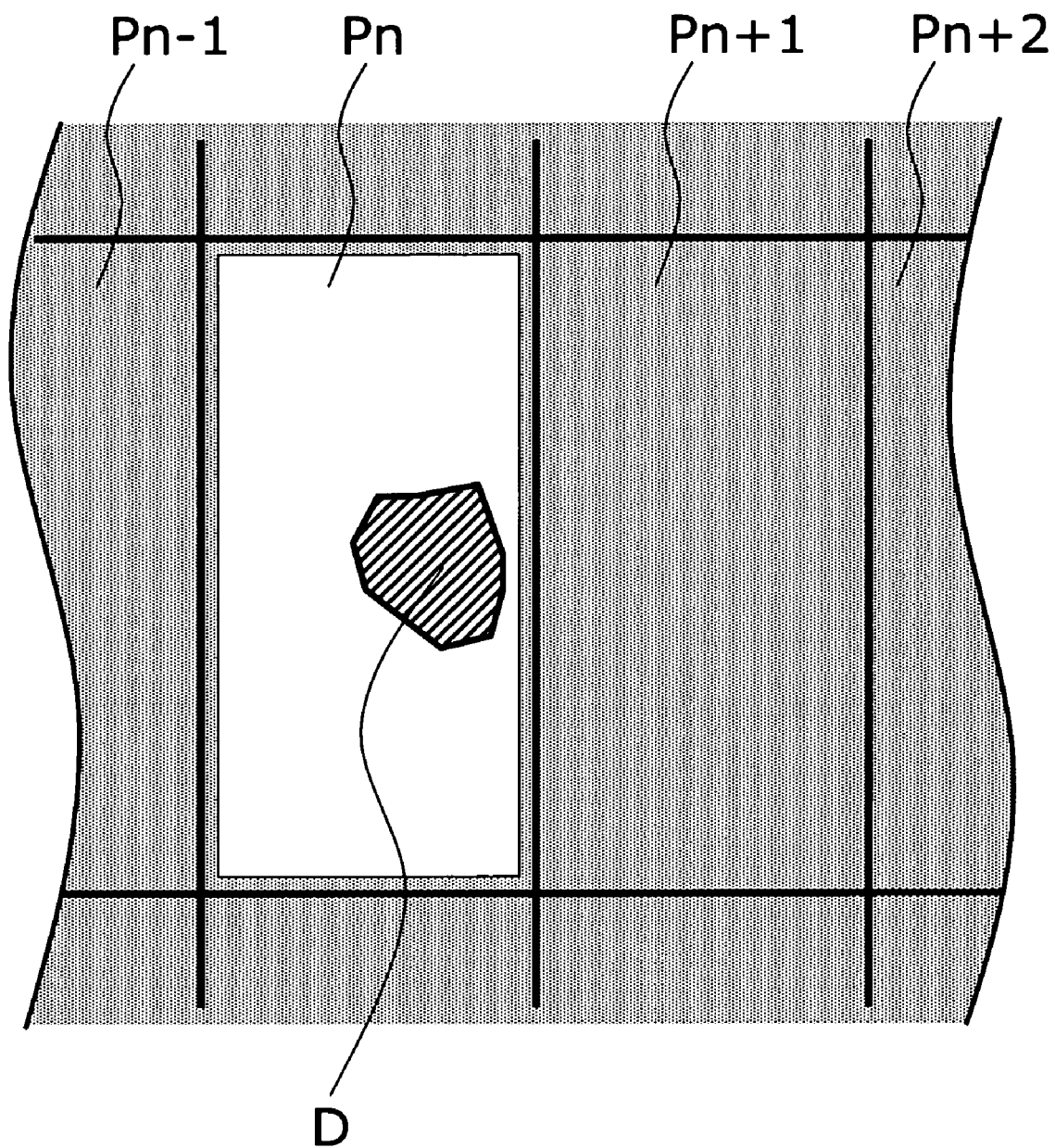
FIG. 7 is a schematic diagram illustrating an image captured by the CCD camera 280.

FIG. 7 is a schematic diagram illustrating an image captured by the CCD camera 280 in this manner.

More specifically, in this example, among the pixels Pn−1, Pn, Pn+1, . . . arranged in a matrix configuration, the pixel Pn is contaminated with a dust D, which causes a bright spot defect. When a bright spot defect occurs, the pixel Pn fails to sufficiently block the transmitted light and always appears as a brighter spot than its surroundings. In this embodiment, such a defective pixel is observed by the CCD camera 280 (step S102), and the dust D is identified (step S104). More specifically, the information on the size, shape, and position of the dust D is obtained.

Automation based on the image recognition technology, for example, can be used in identifying the dust D. More specifically, the controller 260 can be provided with an image recognition function, which allows for analyzing the observed image of the pixel Pn captured by the CCD camera 280, automatically recognizing the dust D, and identifying its size, shape, and position. Here, for example, the observed image can be processed by binarization or other techniques. In addition, the dust D can be graphically approximated by circular, rectangular, polygonal, or other approximation techniques.

Next, a non-irradiation area including the dust D and an irradiation area not including the dust D are determined (step S106). More specifically, when laser light scanning is used as shown in FIG. 2, a scan path of laser light that avoids the dust D can be determined (step S106a).

In addition, as shown in FIGS. 3 and 4, before observing the defective pixel (step S102), a step of inputting defective pixel data (step S100) can be provided to reduce the time to identify the defective pixel.

The method of repairing a liquid crystal panel shown in FIGS. 3 and 4 can be carried out using the system as represented by the repairing apparatus of FIG. 6. The repairing apparatus shown in FIG. 6 has a basic structure similar to that of the repairing apparatus of FIG. 5. However, a tester 295 for inputting defective pixel data is connected to the controller 260. The tester 295 inspects defective pixels such as bright spot defects in the LCD in advance, and outputs positional data such as addresses or coordinates to the controller 260. Here, the tester 295 can be directly connected to the controller 260, or can pass the data via magnetic recording media or other media to the controller 260.

On the basis of the data inputted from the tester 295, the controller 260 moves the XY stage 250 to a given position to make the defective pixel ready to be repaired. Then, the defective pixel is observed (step S102), and operations similar to those for the repairing apparatus of FIG. 5 described above are performed to repair the liquid crystal panel.

Figure 8:
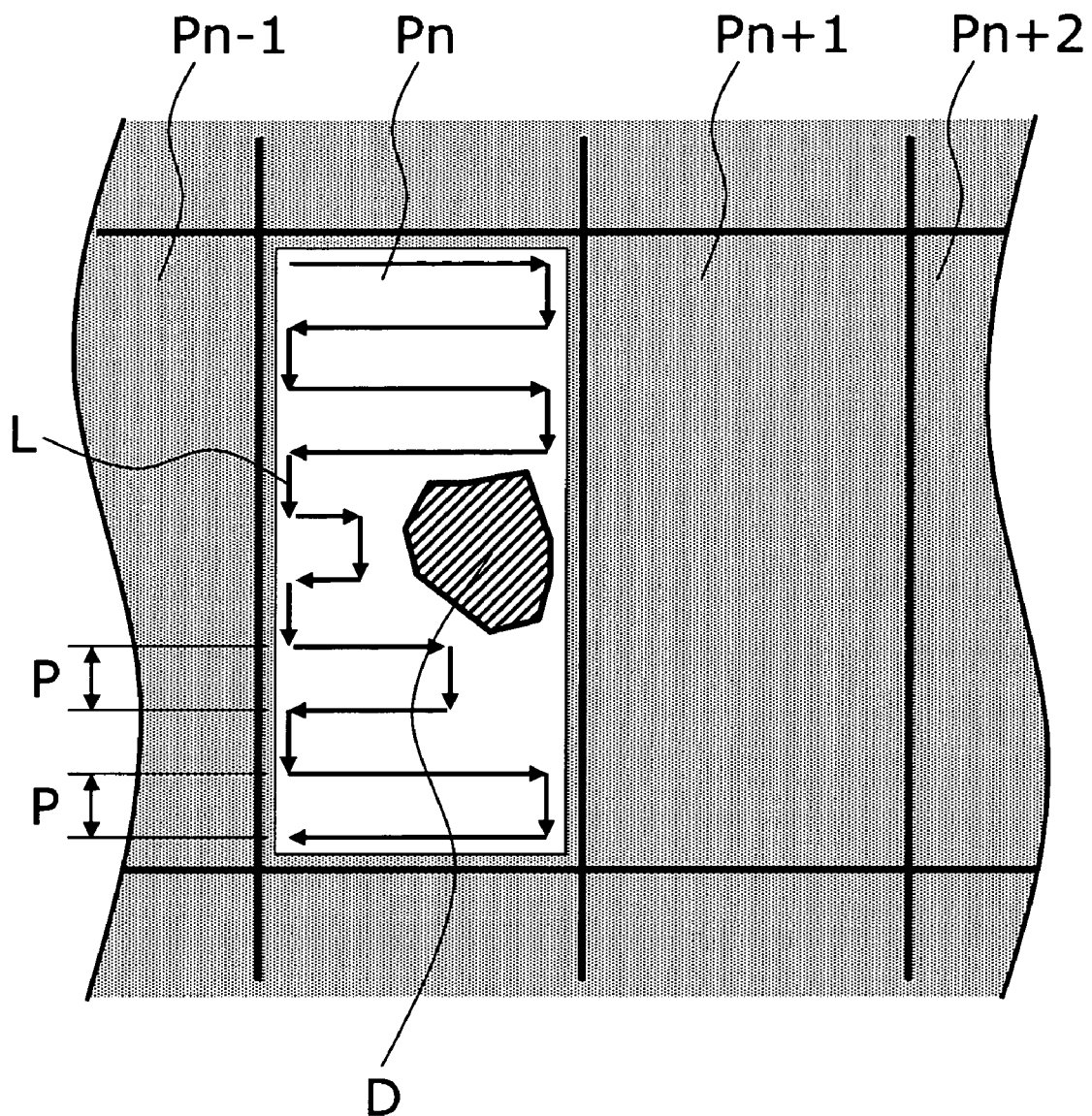
FIG. 8 is a schematic diagram illustrating a scan path determined in this embodiment.

FIG. 8 is a schematic diagram illustrating a scan path determined in this embodiment.

Figure 9:
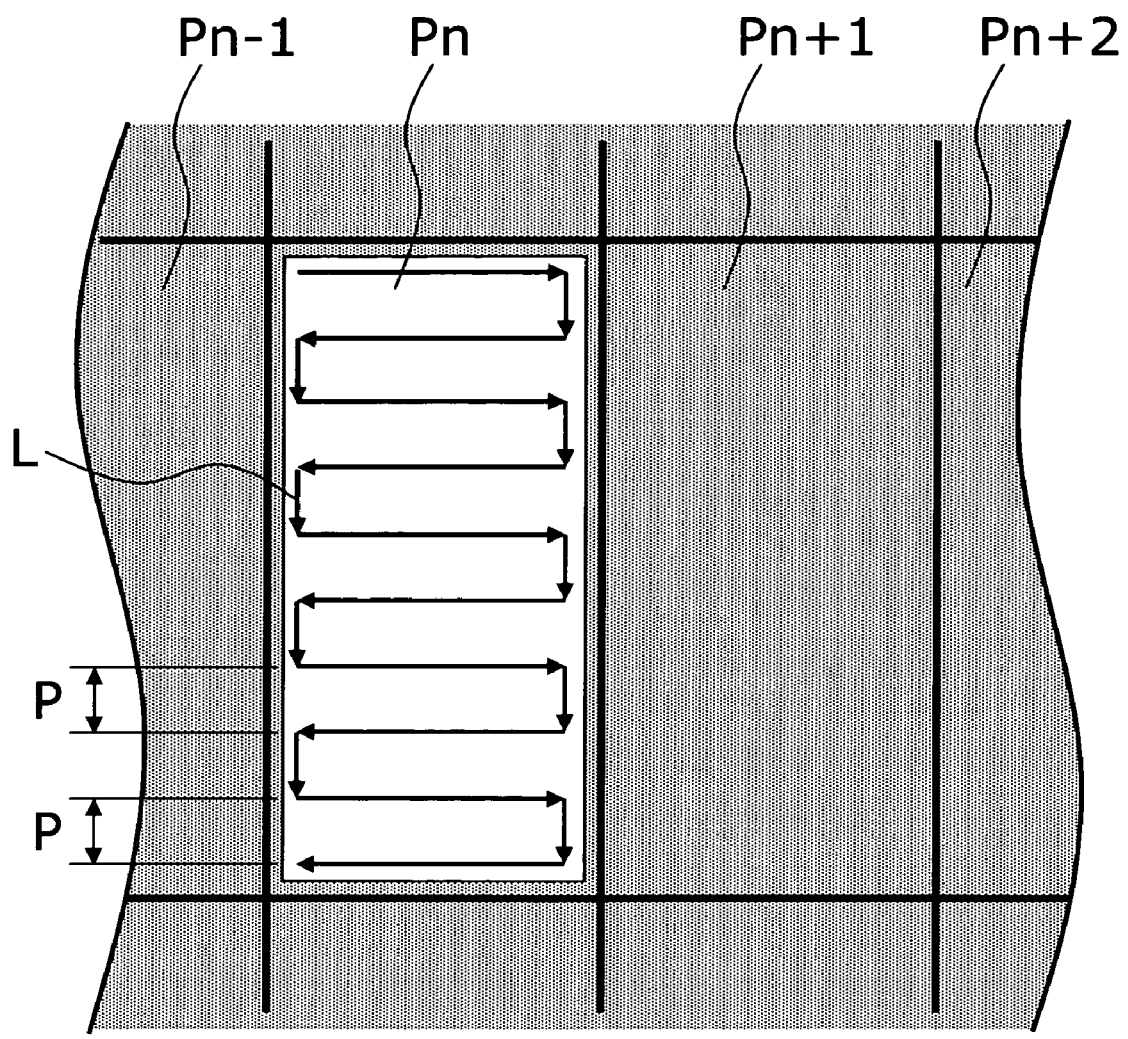
FIG. 9 is a schematic diagram illustrating a scan path in the case of no dust D.

FIG. 9 is a schematic diagram illustrating a scan path in the case of no dust D.

In the case of no dust D, the laser light can be scanned evenly throughout the pixel Pn as illustrated by the scan path L in FIG. 9. In contrast, when there is a dust D, the scan path L is determined so that the dust D is not irradiated with the laser light as shown in FIG. 8. As described later in detail, the pixel Pn measures about tens to hundreds of micrometers on a side, for example. Correspondingly, the beam diameter of the laser light can be set to 3 micrometers or less, for example, and the pitch P of the scan path L can be set to about 10 micrometers, for example. In this way, a dust D having an indefinite shape can be successfully avoided, and its surrounding area can be evenly irradiated with laser light.

This determination of the scan path L can also be automatically performed by the controller 260. For example, on the basis of information on the size, shape, and position of the dust D, the controller 260 can approximate the shape by a simple figure using circular, rectangular, polygonal, or other approximation techniques. Here, approximation to a slightly larger figure with an additional bias will further reduce the risk of irradiation with laser light. Subsequently, the area of the approximated figure is defined as the "non-irradiation area", and the other area is defined as the "irradiation area". The scan path L of the laser light is determined so as to evenly irradiate the "irradiation area". In this way, the determination of the scan path L can be automated.

Subsequently, laser light irradiation is performed along the scan path L as determined (step S108).

More specifically, laser light L is emitted from the laser oscillator 200. The intensity of the laser light is adjusted by the attenuator 210, and the power of the laser light L is monitored by the power monitor 220. Here, in order to prevent the monitored laser light L from deviating from the prescribed condition, a control signal 105 can be fed back to the laser oscillator 200 for control by the controller 260.

While irradiating the liquid crystal panel W with laser light L, the XY stage 250 is translated in two dimensions under the control of the controller 260, thereby conducting laser light irradiation along the scan path L. For example, in the case of a bright spot defect, laser light irradiation can serve to destroy the alignment film by thermal decomposition. This randomizes the orientation of the liquid crystal and reduces the optical transmittance of the associated pixel. In this case, preferably, the laser light has a spot diameter of about 1 to 5 micrometers and an energy of about 0.1 to 10 microjoules, for example. The repetition frequency can be about 100 to 50000 hertz, and the scan speed can be about 0.1 mm/sec to 10 mm/min.

Figure 10:
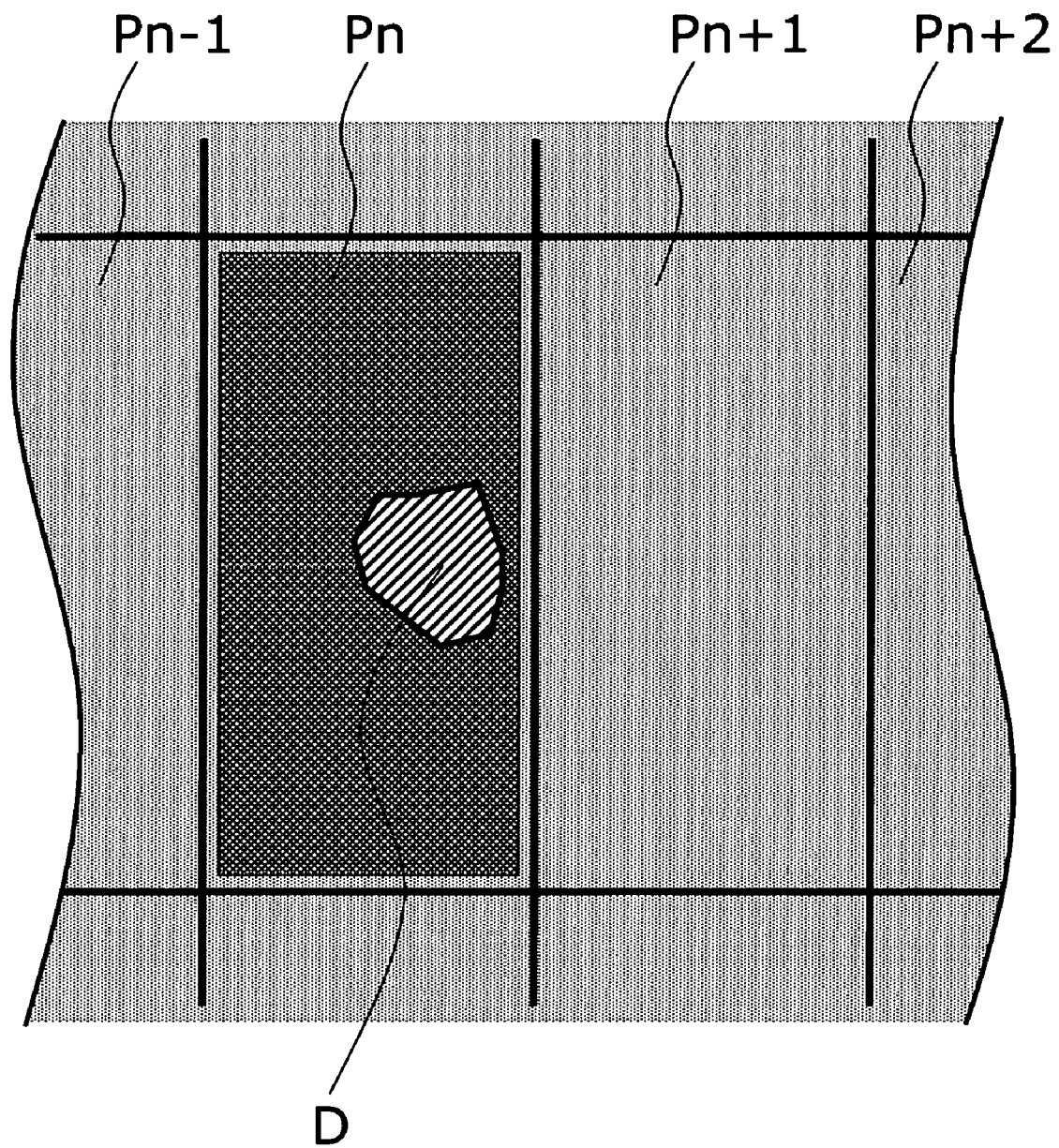
FIG. 10 is a schematic diagram showing a pixel repaired by irradiation with laser light L.

FIG. 10 is a schematic diagram showing a pixel repaired by irradiation with laser light L.

More specifically, in the case of a bright spot defect, as shown in the figures such as FIG. 8, the defective pixel Pn has a increased transmittance and always remains brighter than its surroundings. In contrast, when the alignment film is destroyed by laser light irradiation, the orientation of the liquid crystal is lost and the optical transmittance decreases. As a result, as shown in FIG. 10, the pixel has a lower contrast than the surrounding pixels and is obscured.

Here, the phenomenon occurring when a dust D is irradiated with laser light is described.

Figure 11A:
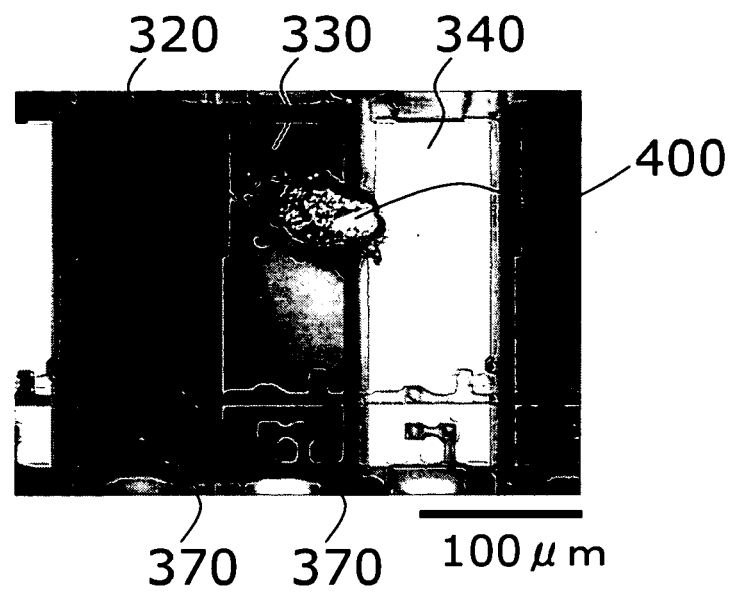
FIG. 11 is a photograph showing an example experiment where a dust is irradiated with laser light.

FIG. 11 is a photograph showing an example experiment where a dust is irradiated with laser light.

More specifically, in this example experiment, a red (R) pixel 320, a blue (B) pixel 330, and a green (G) pixel 340 are separated by a black matrix 370, and a dust 400 is present on the blue pixel 330. This liquid crystal display device is a display panel for personal computers. The pixel 330 measures 200 micrometers long and 70 micrometers wide. The dust 400 measures about 50 micrometers. Typically, the dust size exceeding 5 micrometers leads to a visibility problem.

Figure 11B:
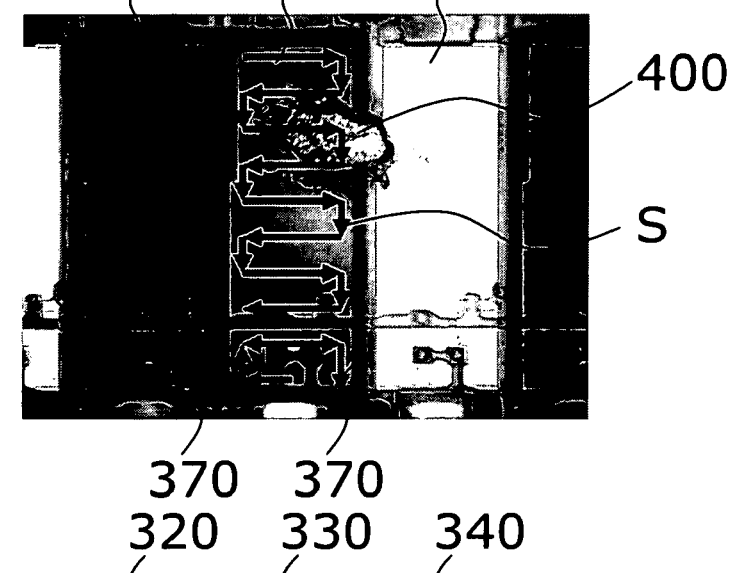

As shown in FIG. 11B, this pixel 330 is irradiated with laser light along a scan path L that overlaps the dust 400. The laser light used here is produced from a YAG laser having a wavelength of 1064 nanometers. A beam having a power of about 1 microjoule is converged to a diameter of about 3 micrometers.

Figure 11C:
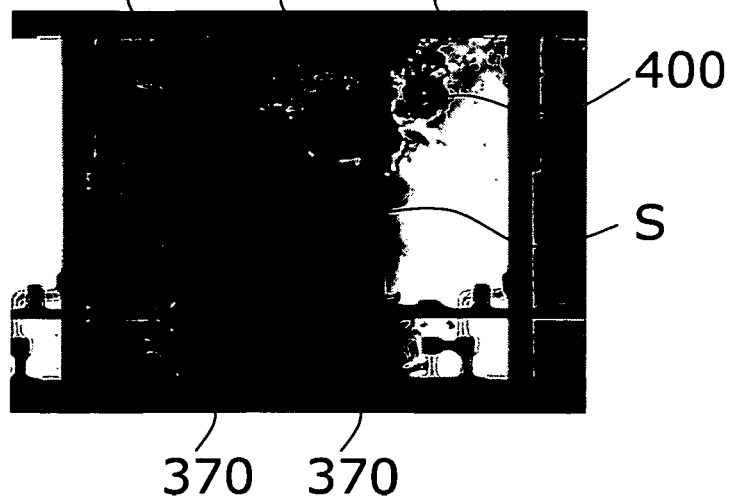

The result is as shown in FIG. 11C. The dust 400 is shattered, and not only the pixel 330 but also its adjacent pixels 320 and 340 are damaged. The dust 400 may be originated from various sources, and is often made of organic, inorganic, or metallic materials having the same nature as the elements constituting the liquid crystal panel. Dusts attached to the liquid crystal panel were measured with respect to the absorbance of laser light (having a wavelength of 1064 and 532 nanometers). It was found that every dust has an absorbance several to tens of times higher than that of the pixel portion of the liquid crystal panel. That is, it is contemplated that a dust attached to the liquid crystal panel has a much higher absorbance than its surrounding pixel portion and absorbs laser light with a higher efficiency, thereby being heated, decomposed, and shattered.

When a dust is shattered by laser light irradiation, its surrounding pixels are also damaged, and the defect is expanded. That is, despite the purpose of repairing the display defect, the display performance of the liquid crystal panel is conversely decreased.

In contrast, according to this embodiment, as described above with reference to FIGS. 1 to 10, the dust is not irradiated with laser light, and only its surrounding area is irradiated with laser light. This allows for repairing the defective pixel without shattering the dust. As a result, the manufacturing yield of high-resolution liquid crystal panels can be increased, and they can be offered at low cost. Furthermore, the increased yield in the manufacturing process reduces the number of rejected defective products and saves material and energy resources, thereby also contributing to environmental conservation.

Figure 12:
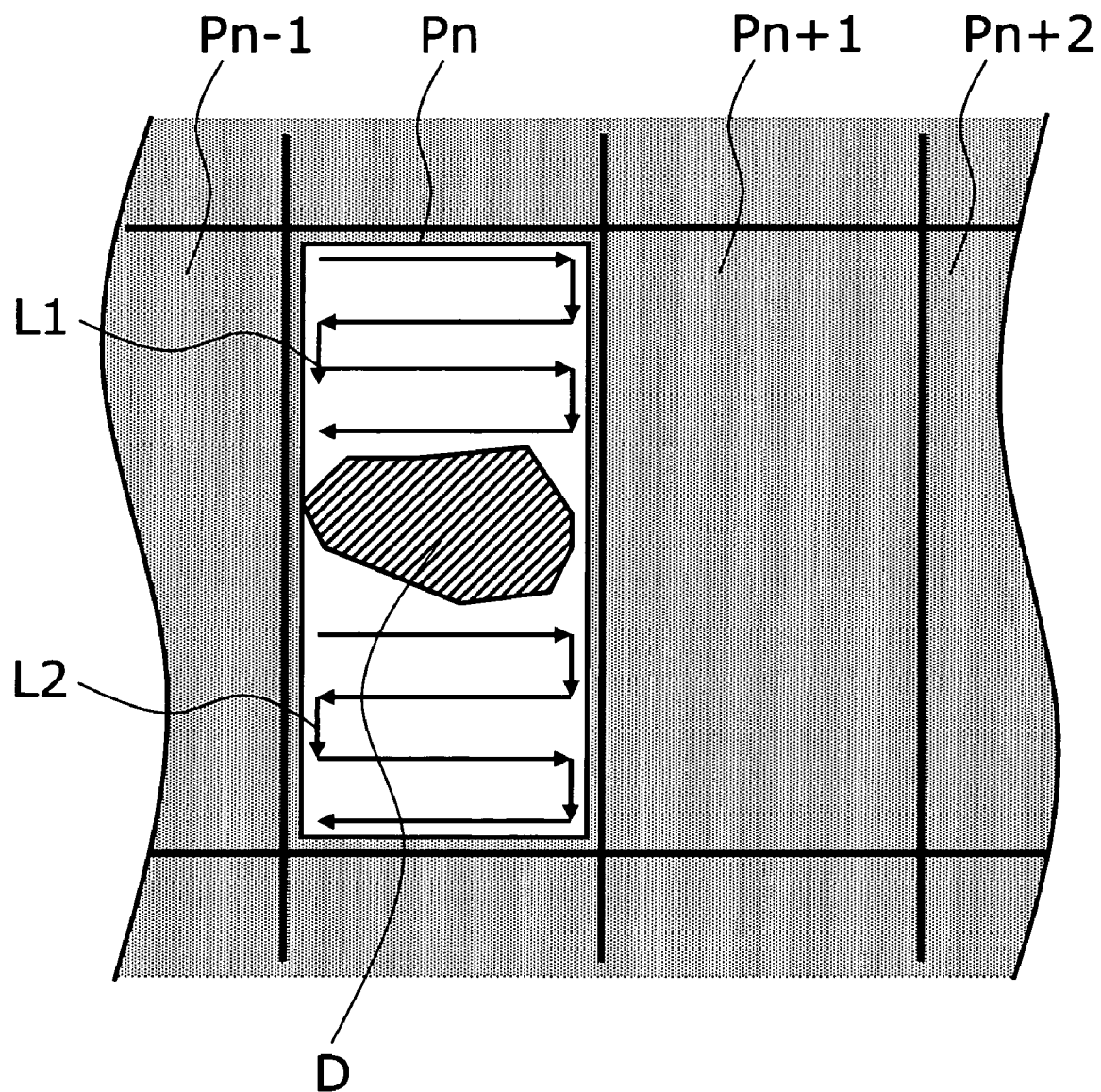
FIGS. 12 and 13 are schematic diagrams showing another example scan path used in this embodiment.
Figure 13:
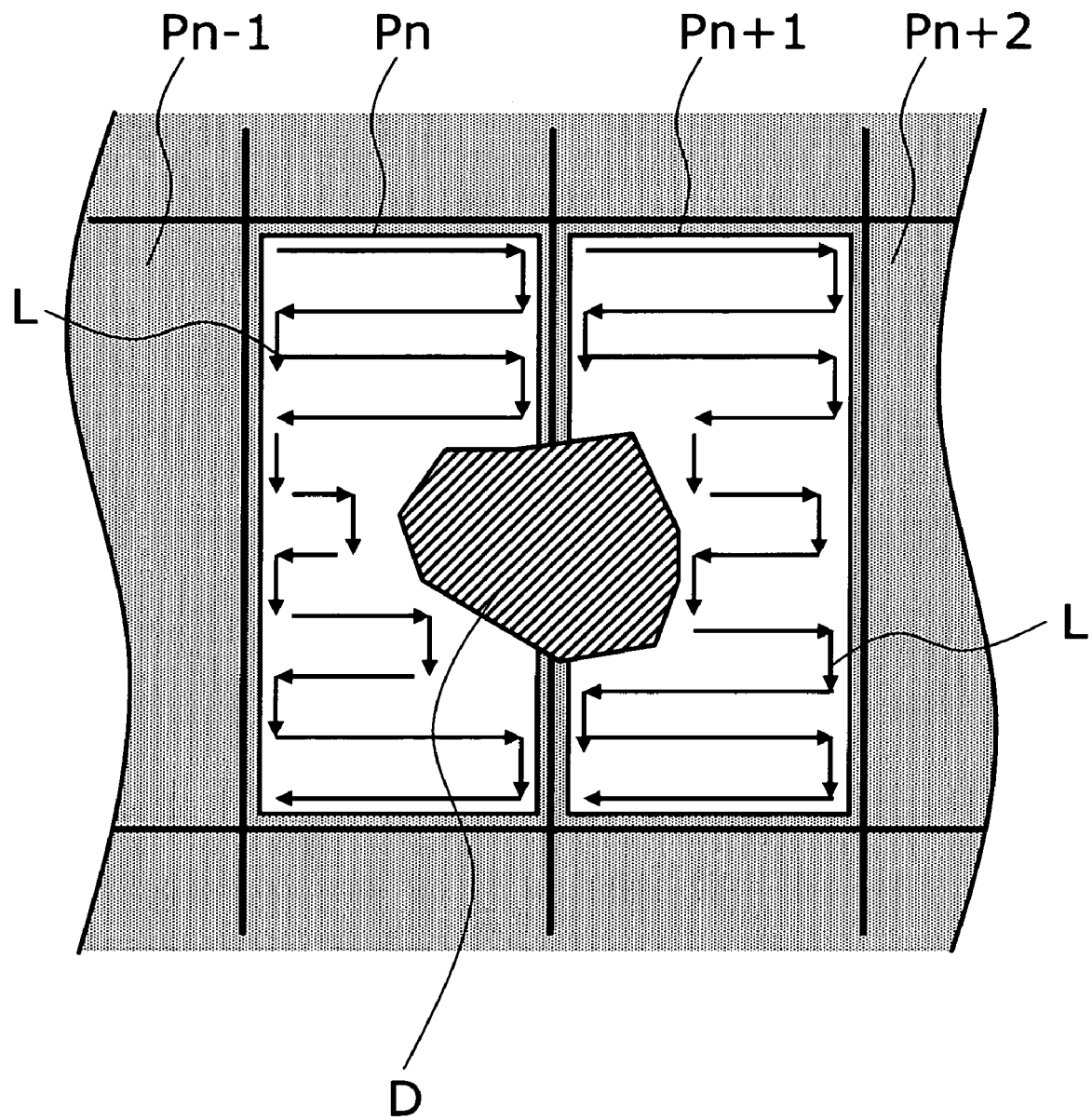

FIGS. 12 and 13 are schematic diagrams showing another example scan path used in this embodiment.

More specifically, when a dust D is located so as to divide the pixel Pn, scan paths L1 and L2 of laser light can be defined in the respective divided portions of the pixel.

If, as shown in FIG. 13, a dust is located over a plurality of pixels, which thus require repairing, then a scan path L of laser light can be defined for each of these pixels.

Figure 14:
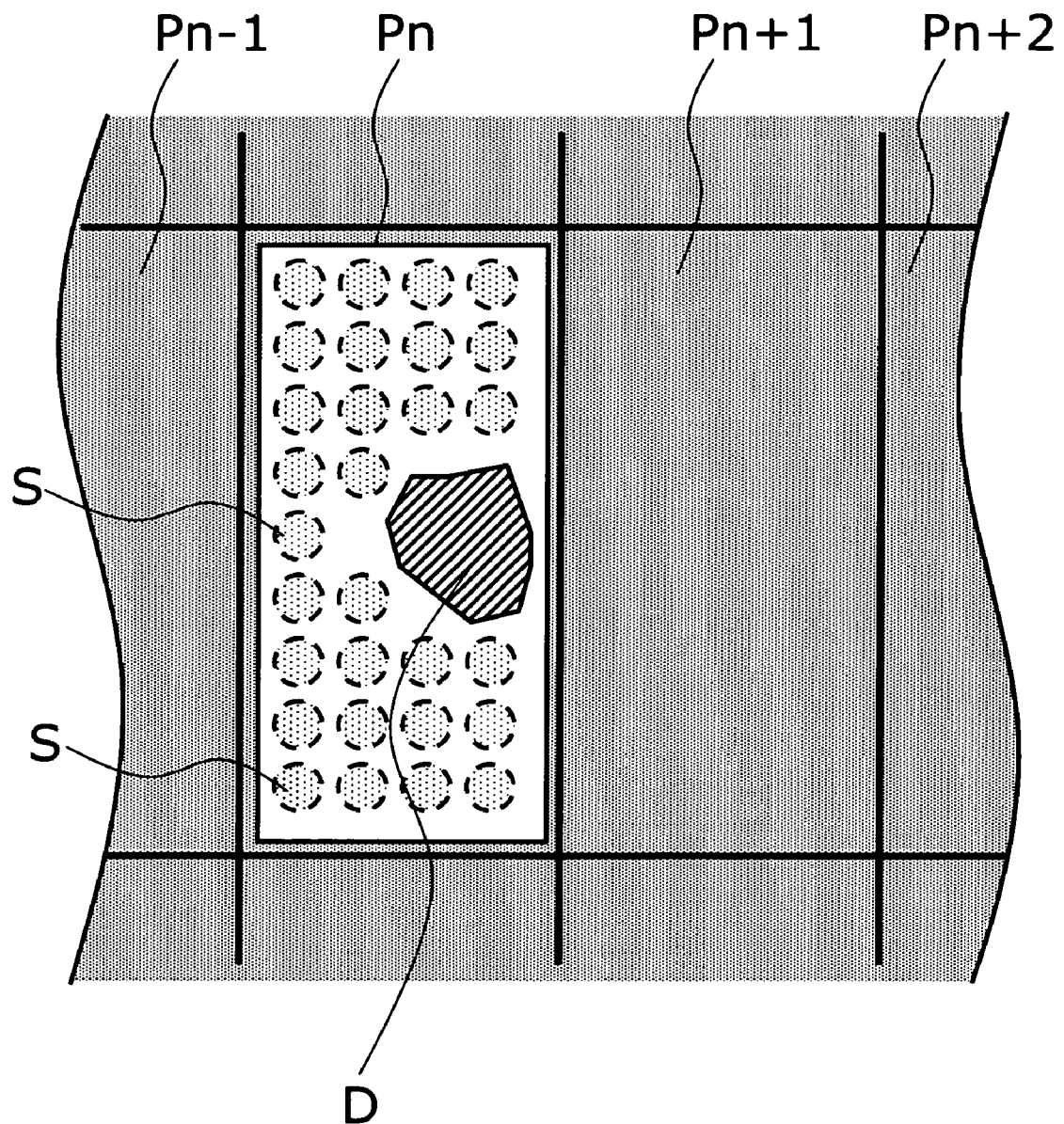
FIGS. 14 and 15 are schematic diagrams showing a method of distributing laser light spots S over an irradiation area by intermittent irradiation with laser light.
Figure 15:
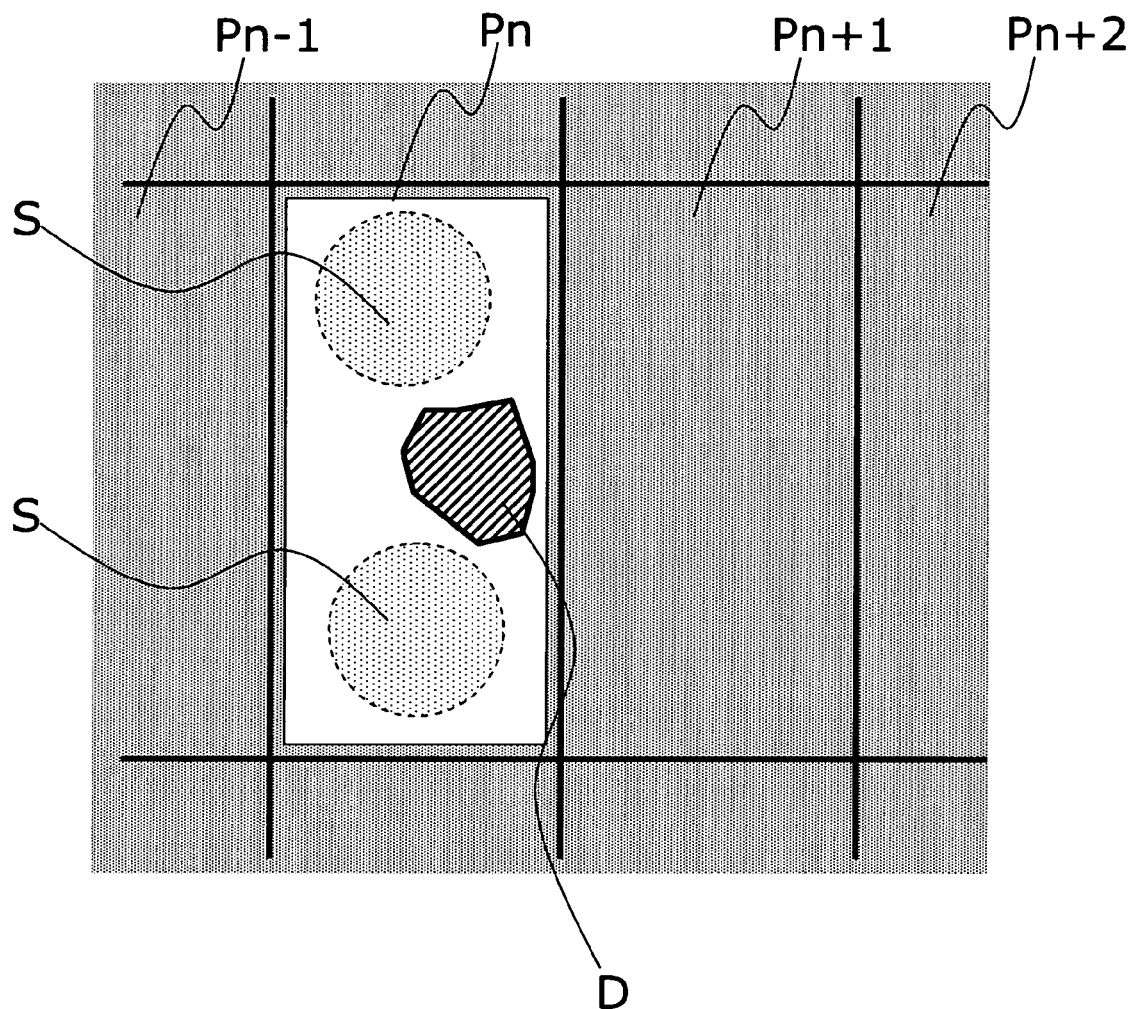

This invention is not necessarily limited to the method of continuously scanning laser light in repairing a defective pixel. For example, as illustrated in FIGS. 14 and 15, a method of intermittent irradiation with laser light can also be used to distribute laser light spots S over the irradiation area. In this case, likewise, the distribution of spots S can be determined so as not to irradiate the dust D with laser light. When the size of the laser light spot S is set smaller as illustrated in FIG. 14, the laser light can be evenly distributed over the area to be irradiated.

On the other hand, when the size of the laser light spot S is set larger as illustrated in FIG. 15, the number of times of laser light irradiation can be decreased, and thereby the repairing can be advantageously completed in a shorter time.

Next, an example step of repairing a defective pixel by laser light irradiation is described.

Figure 16:
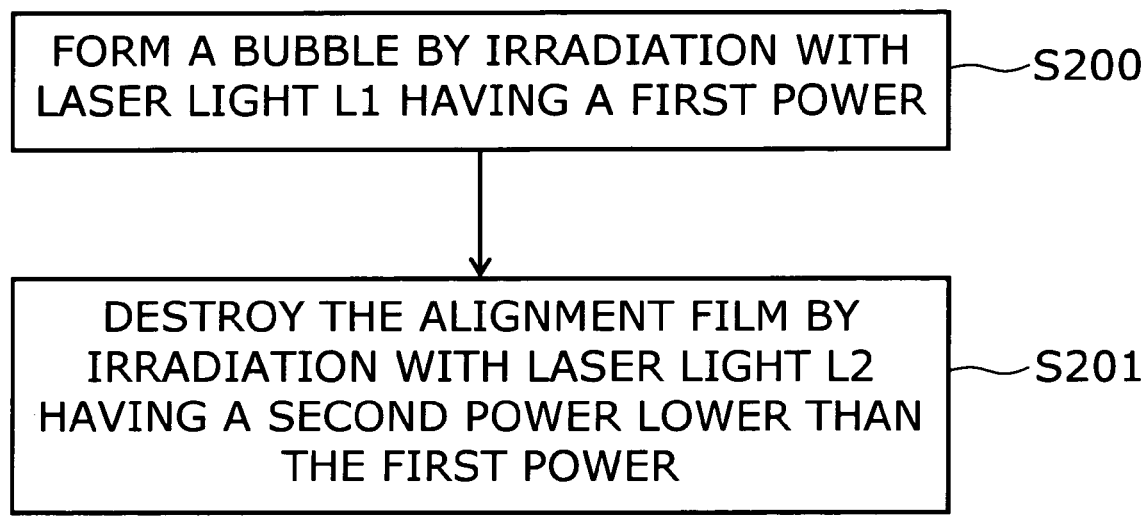
FIG. 16 is a flow chart illustrating a procedure of irradiating a defective pixel with laser light.

FIG. 16 is a flow chart illustrating a procedure of irradiating a defective pixel with laser light.

FIGS. 17 and 18 are schematic cross sections for describing how a liquid crystal panel is repaired.

First, the structure of the liquid crystal panel is described.

Figure 17A:
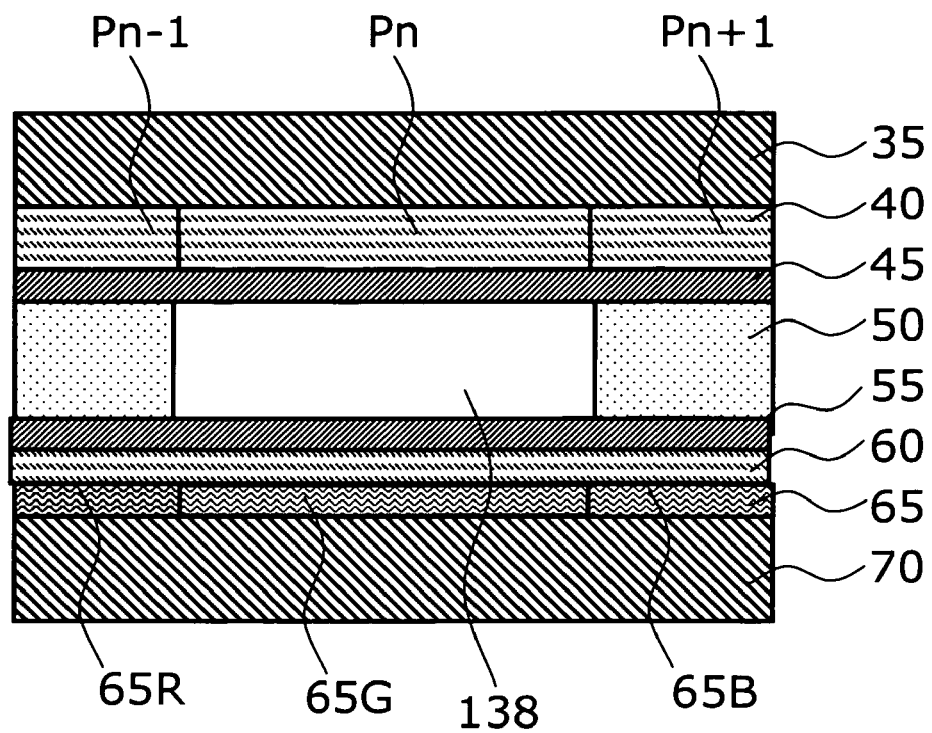
FIGS. 17 and 18 are schematic cross sections for describing how a liquid crystal panel is repaired.

As shown in FIG. 17A, the liquid crystal panel has a pair of glass substrates 35, 70. A polarizing plate (not shown) is affixed to the outer major surface of each of the glass substrates 35, 70. On the inner major surface of the glass substrate 35 is formed an array region 40, on which an alignment film 45 is formed. The array region 40 comprises a plurality of array sites (Pn−1, Pn, Pn+1, . . .) arranged in a matrix configuration and serves to apply voltage to the liquid crystal 50 for each pixel. The array region 40 includes, for example, interconnect layers, switching elements such as TFTs, interlayer insulating films, planarization regions made of resin and the like, and pixel electrodes.

On the opposite side, on the inner major surface of the glass substrate 70, a color filter 65, an opposed electrode 60, an alignment film 55, and the like are laminated in this order. The color filter 65 typically consists of three colors 65R (red), 65G (green), and 65B (blue) corresponding to the three primary colors of light. That is, the liquid crystal 50 is sandwiched between the alignment films 45 and 55. It is assumed here that the array site Pn is a defective pixel having a bright spot defect.

Figure 17B:
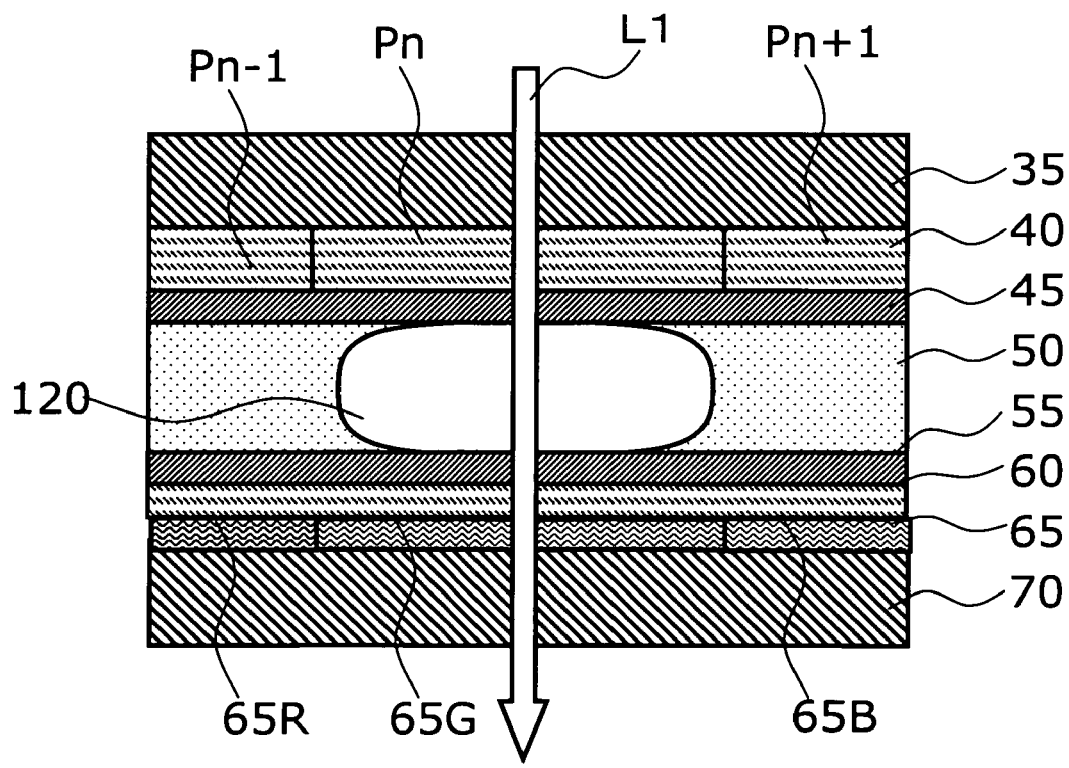

As shown in FIG. 17B, the array site Pn is irradiated with laser light L1 having a first power (step S200). Then the energy E1 of the laser light L1 having the first power locally increases the temperature of the liquid crystal 50 in the vicinity of the array site Pn. Thus the liquid crystal 50 at the array site Pn is vaporized to form a bubble 120.

Figure 18A:
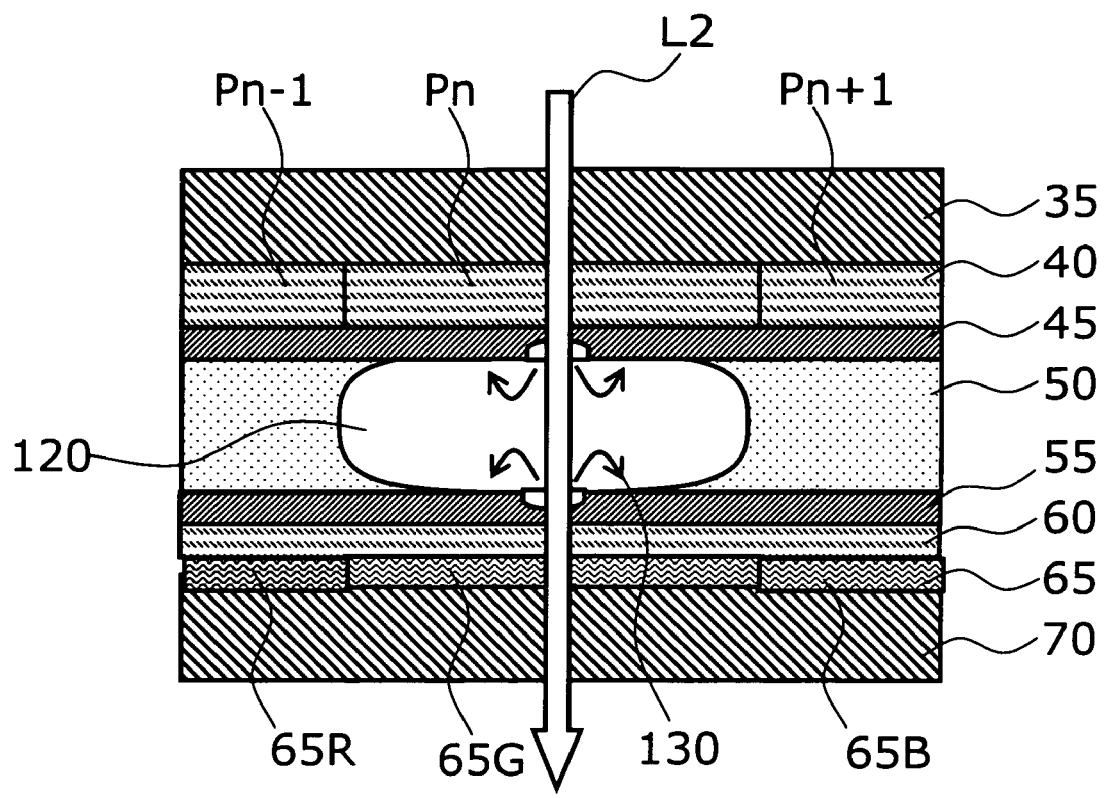

Subsequently, as shown in FIG. 18A, the array site Pn is irradiated and scanned with laser light L2 having a second power lower than the first power (step S201). The energy E2 of the laser light L2 having the second power passes through the bubble 120 and hence is not absorbed by the liquid crystal 50. Therefore the energy of the laser light L2 is efficiently supplied to the alignment films 45, 55 exposed inside the bubble 120. Thus the alignment films 45, 55 are rapidly heated and destroyed.

Figure 18B:
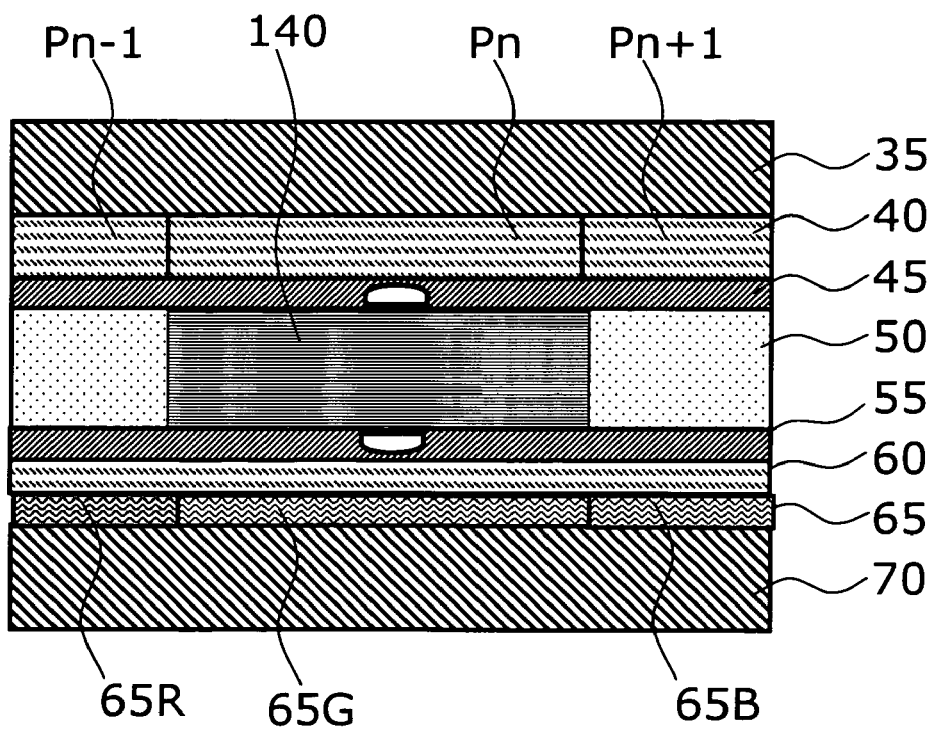

As a result, as shown in FIG. 18B, the alignment films 45, 55 of the array site Pn, which is a defective pixel, are disturbed. Thus the defective pixel is definitely darkened. That is, the liquid crystal panel is successfully repaired.

In this embodiment, the power of laser light can be adjusted depending on whether a dust is present on the defective pixel.

Figure 19:
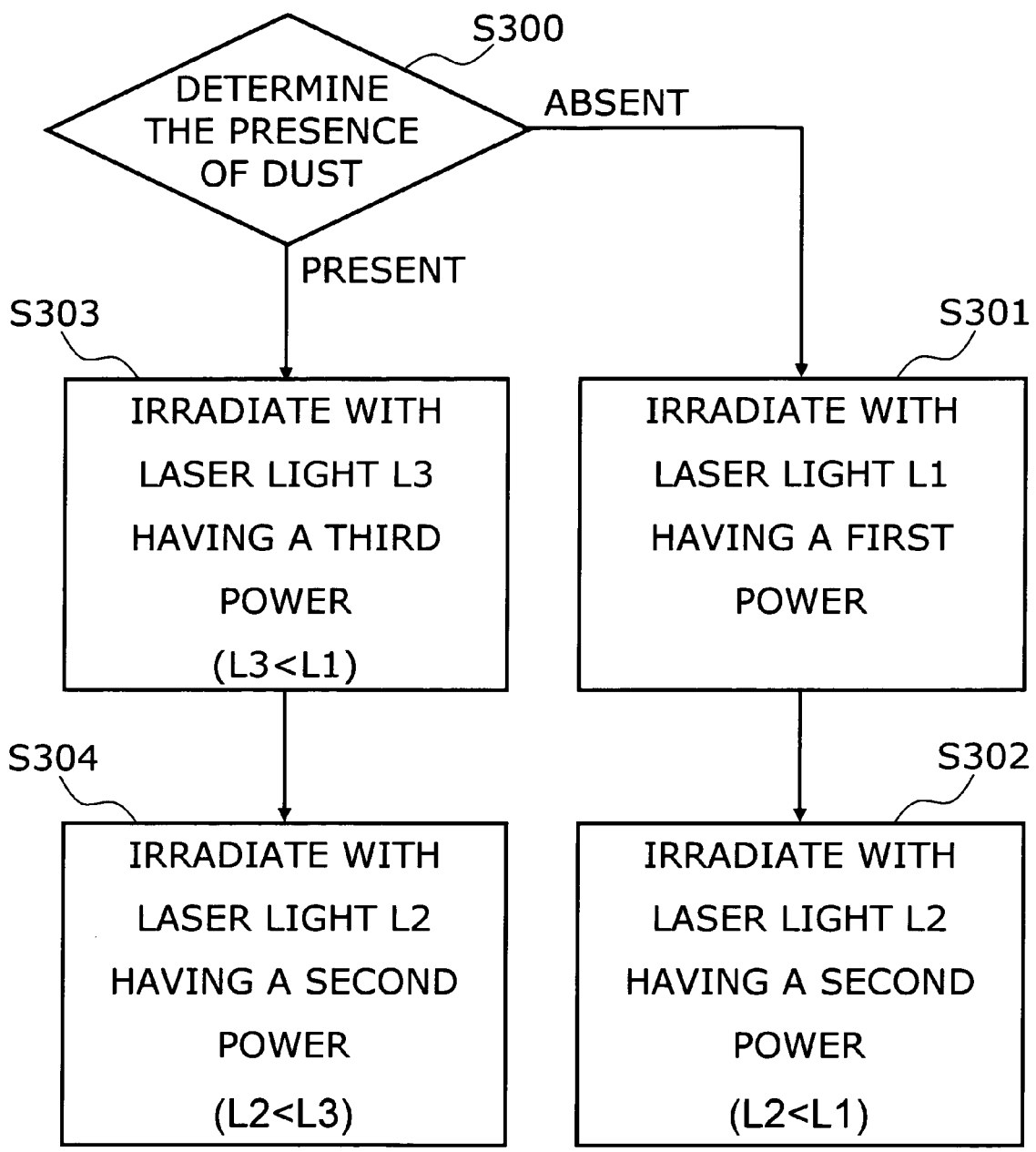
FIG. 19 is a flow chart showing a method of selecting energy for irradiating a defective pixel.

FIG. 19 is a flow chart illustrating a method of selecting the power of laser light for irradiating a defective pixel.

The method begins by determining whether a dust is present on the defective pixel (step S300). This is, for example, similar to the steps S102 and S104 in the flow chart shown in FIG. 1. When it is determined that a dust is not present (ABSENT), a bubble 120 is formed in the liquid crystal 50 by irradiation with laser light L1 having a first power (step S301). Subsequently, the alignment films are destroyed by irradiation with laser light L2 having a second power lower than the power of the laser light L1 (step S302).

Here, the first laser light L1 has a power of 5 microjoules, for example, and the second laser light L2 has a power of 0.5 microjoule, for example. That is, the ratio of power between the first laser light L1 and the second laser light L2 can be about 10:1 (L1>L2).

On the other hand, when it is determined that a dust is present (PRESENT), a bubble 120 is formed by irradiation with a third laser light L3 having a power lower (L1>L3) than the above-mentioned first laser light L1 (step S303). Subsequently, the alignment films are destroyed by irradiation with laser light L2 like step S302. Here, the power of the third laser light L3 is higher than the power of the second laser light L2 (L2<L3).

That is, the power of the laser light L3 for forming a bubble in the presence of a dust is made smaller than the power of the laser light L1 for forming a bubble in the absence of a dust. The reason for this is as follows. If a defective pixel with a dust is irradiated with high-power laser light, a large bubble is rapidly formed. Its impact may cause the dust to move or shatter. Moving or shattering of the dust will expand the defect. In contrast, according to the present example, laser light L3 having a lower power is used for forming a bubble when a dust is present. Thus a bubble can be formed in the defective pixel without shattering the dust.

Figure 20:
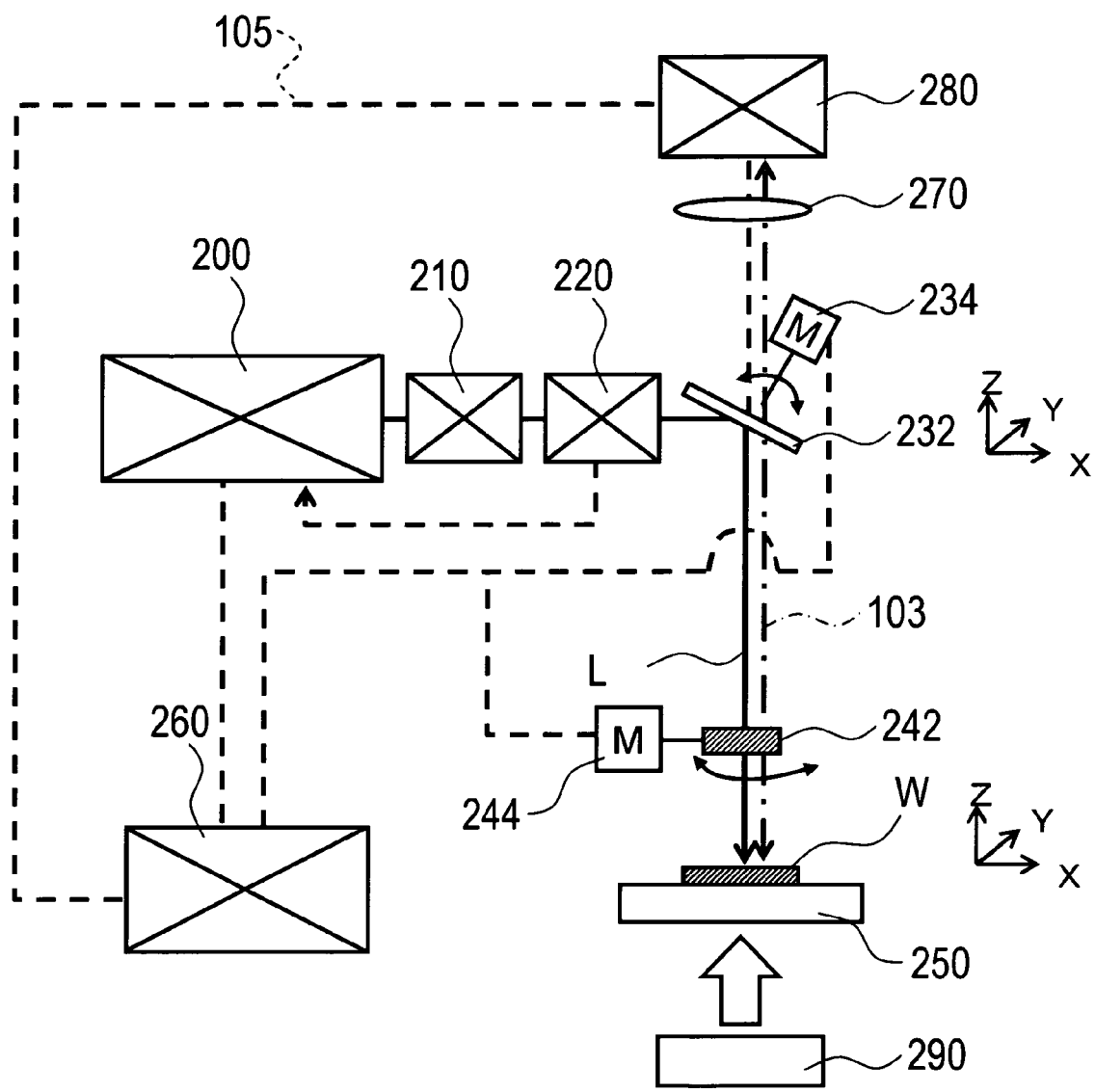
FIGS. 20 and 21 are schematic diagrams showing another example of the repairing apparatus useful in the invention.
Figure 21:
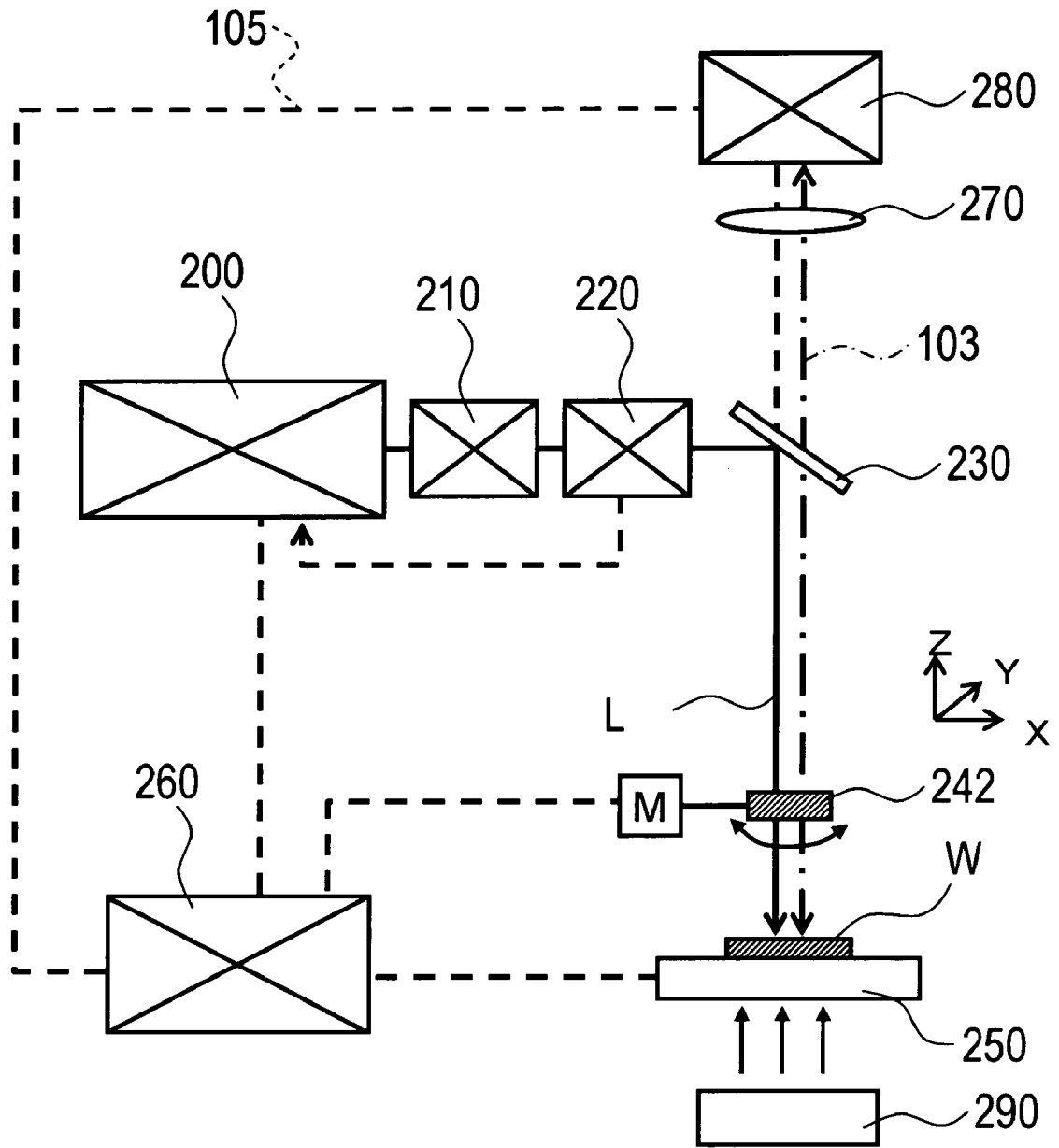

FIGS. 20 and 21 are schematic diagrams showing another example of the repairing apparatus useful in the invention. With regard to these figures, elements similar to those described above with reference to FIGS. 1 to 19 are marked with the same reference numerals and not described in detail.

The example shown in FIG. 20 includes a movable galvanomirror 232 and condensing lens 242 driven by motors 234 and 244, respectively. On the occasion of irradiation with laser light L, the reflecting surface of the galvanomirror 232 is appropriately moved in XYZ directions. The condensing lens 242 also controls the irradiation spot while moving its optical axis along the sphere centered on the galvanomirror 232 in synchronization. This allows for irradiation with laser light L along a prescribed scan path.

The example shown in FIG. 21 includes a condensing lens 242 driven by a motor 244. That is, the optical axis of the condensing lens 242 is appropriately driven in XYZ or oblique directions, thereby allowing for irradiation with laser light L along a prescribed scan path.

In this invention, the repairing apparatus does not necessarily need to include the observation means. That is, an observation device separate from the repairing apparatus can be used to observe a liquid crystal panel, to obtain information on a defective pixel and the shape, size, and position of a dust included therein, and to input this information to the repairing apparatus, thereby allowing the repairing apparatus to conduct laser light irradiation on the basis of this information.

Embodiments of the invention have been described with reference to the examples. However, the repairing method and apparatus of the invention are not limited to these examples. For example, the method of determining the irradiation condition, irradiation area, and non-irradiation area of laser light used for repairing, the method of scanning laser light, and the elements constituting the repairing apparatus that are variously adapted by those skilled in the art are also encompassed within the scope of the invention as long as they include the features of the invention.

The invention claimed is:

1. A method of repairing a liquid crystal panel by irradiating a defective pixel of the liquid crystal panel with laser light, comprising:
    identifying the defective pixel including a dust; and
    irradiating at least part of an alignment film in the defective pixel outside the dust with laser light while the dust is not substantially irradiated with the laser light in the defective pixel including the dust so that an optical transmittance of the deflective pixel becomes lower than an optical transmittance of each of pixels surrounding the defective pixel, wherein
    the irradiation of the laser light is conducted by irradiation with laser light having a high power followed by irradiation with laser light having a low power.

2. The method of repairing a liquid crystal panel according to claim 1, further comprising:
    determining a scan path of the laser light that avoids the dust.

3. The method of repairing a liquid crystal panel according to claim 1, wherein the defective pixel has a bright spot defect.

4. The method of repairing a liquid crystal panel according to claim 1, wherein the irradiation with the laser light destroys the alignment film included in the defective pixel.

5. The method of repairing a liquid crystal panel according to claim 1, wherein, when the dust is located so as to divide the defective pixel, each divided portion of the pixel is irradiated with the laser light.

6. A method of repairing a liquid crystal panel by irradiating a defective pixel of the liquid crystal panel with laser light, comprising:
    identifying the defective pixel including a dust; and
    irradiating at least part of an alignment film in the defective pixel outside the dust with laser light while the dust is not substantially irradiated with the laser light in the defective pixel including the dust so that an optical transmittance of the defective pixel becomes lower than an optical transmittance of each of pixels surrounding the defective pixel, wherein,
    a defective pixel not including a dust is irradiated with laser light having a first power, and then irradiated with laser light having a second power lower than the first power, and
    a defective pixel including a dust is irradiated with laser light having a third power lower than the first power and higher than the second power, and then irradiated with laser light having the second power.

7. A method of repairing a liquid crystal panel by irradiating a defective pixel of the liquid crystal panel with laser light, comprising:
    identifying the defective pixel including a dust;
    determining a non-irradiation area including the dust and an irradiation area not including the dust in the defective pixel including the dust; and
    irradiating at least part of an alignment film in the irradiation area with laser light while the non-irradiation area is not irradiated with the laser light so that an optical transmittance of the defective pixel becomes lower than an optical transmittance of each of pixels surrounding the defective pixel, wherein
the irradiation of the laser light is conducted by irradiation with laser light having a high power followed by irradiation with laser light having a low power.

8. The method of repairing a liquid crystal panel according to claim 7, further comprising:
determining a scan path of the laser light that does not extend beyond the irradiation area.

9. The method of repairing a liquid crystal panel according to claim 7, wherein the defective pixel has a bright spot defect.

10. The method of repairing a liquid crystal panel according to claim 7, wherein the irradiation with the laser light destroys the alignment film included in the defective pixel.

11. The method of repairing a liquid crystal panel according to claim 7, wherein, when the dust is located so as to divide the defective pixel, each divided portion of the pixel is irradiated with the laser light.

12. A method of repairing a liquid crystal panel by irradiating a defective pixel of the liquid crystal panel with laser light, comprising:
identifying the defective pixel including a dust;
determining a non-irradiation area including the dust and an irradiation area not including the dust in the defective pixel including the dust; and
irradiating at least part of an alignment film in the irradiation area with laser light while the non-irradiation area is not irradiated with the laser light so that an optical transmittance of the defective pixel becomes lower than an optical transmittance of each of pixels surrounding the defective pixel, wherein,
a defective pixel not including a dust is irradiated with laser light having a first power, and then irradiated with laser light having a second power lower than the first power, and
a defective pixel including a dust is irradiated with laser light having a third power lower than the first power and higher than the second power, and then irradiated with laser light having the second power.

* * * * *